July 16, 1946.  F. J. VEITCH  2,404,259
PIPE FITTING
Filed Nov. 19, 1943
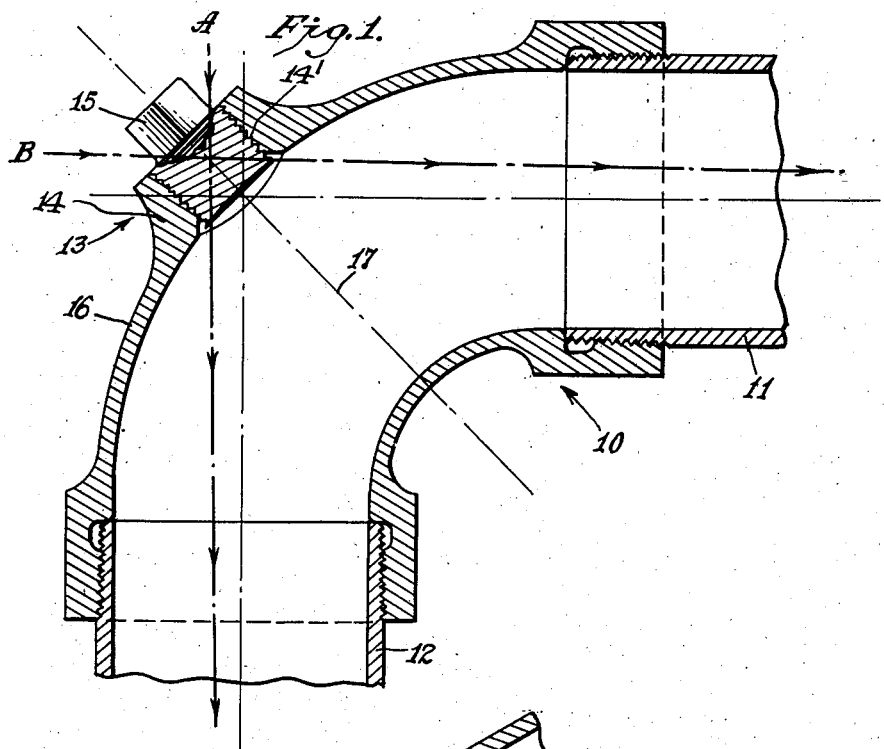
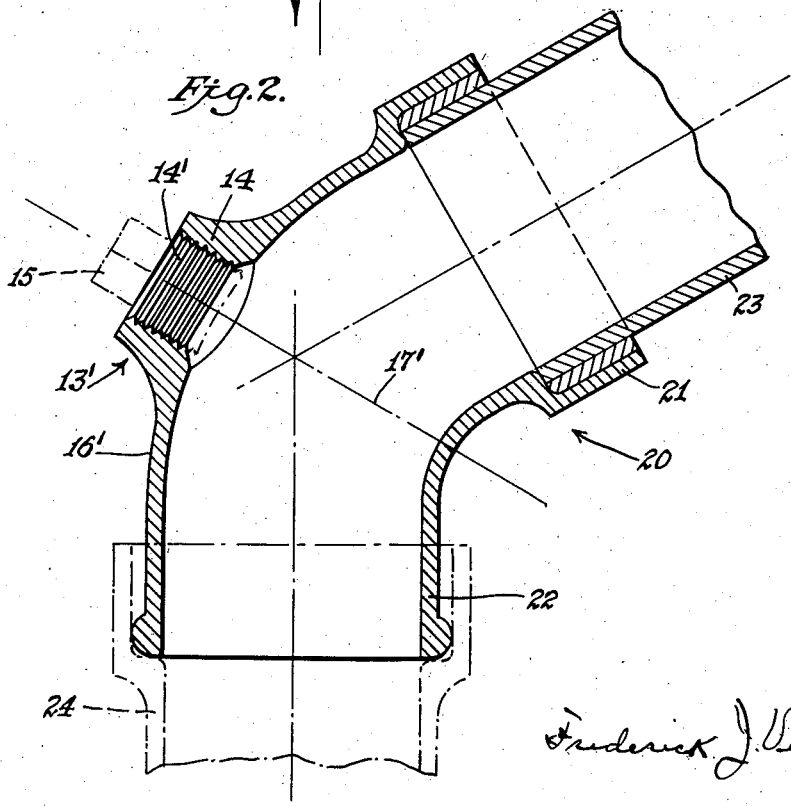
INVENTOR
Frederick J. Veitch Patented July 16, 1946

2,404,259

UNITED STATES PATENT OFFICE 2,404,259

PIPE FITTING

Frederick J. Veitch, Flushing, N. Y.

Application November 19, 1943, Serial No. 510,856

1 Claim. (Cl. 285—211)

This invention relates to pipe fittings, such as elbows and bends of various angles used in waste and sewer lines, and more particularly to cleanouts for the same. An object of the invention is to provide an elbow or bend in which a cleanout is located at the center of the heel of the fitting which is usually about midway of the pipe connections at the opposite ends of the fitting, although some are made with one of the ends longer than the other.

With a cleanout located at the center of the heel regardless of whether the ends are of equal length or not, a wire or other tool may be inserted through the cleanout opening, after the removal of the screw used to seal the opening, and because of its particular location the cleanout opening will afford access to either of the pipes connected respectively at opposite ends of the fitting with equal facility, so that any obstruction in the line may be reached.

While it is not new to use cleanouts in waste and sewer lines they are commonly placed in the ends of Y and TY fittings and afford access to the line in only one direction. If stoppage occurs on the branch side of these fittings the cleanouts so located are no use whatsoever, as the wire cannot be introduced around the sharp angular turn of the branch. Furthermore, fittings of this character are far more expensive than elbows or bends. It will thus be seen that the present invention possesses the advantages of economy as well as utility.

In the drawing forming a part of this specification,

Fig. 1 is a longitudinal section showing a 90 degree elbow with the broken away ends of pipes threaded in the opposite ends thereof, and with a cleanout applied in accordance with this invention.

Fig. 2 is a similar section showing a 60 degree bend of the hub and spigot type, and to which a cleanout is similarly applied.

Referring to the drawing, 10 is a waste fitting commonly known to the trade as a 90 degree drainage elbow, and to the opposite ends of which pipes 11 and 12 are respectively threaded. A cleanout 13 forming a part of said fitting, consists of a boss 14 on the heel of the fitting and having an opening 14' therethrough which is tapped to receive a screw 15 for sealing the opening by means of the tapered pipe thread shown. It is important that the cleanout be located at substantially the center of the heel 16 of the elbow, and preferably so that its axis will coincide with the central radius of the heel indicated by the broken line 17. The heavy broken lines A and B indicate respectively the path of a wire when inserted in either of the required directions to clean the line beyond opposite ends of the elbow. It will be noted that the bottom of the screw 15 is concave and conforms to the curvature of the inner surface of the heel so that any tendency for obstructions to form at this point will be minimized by a slip line contour.

The 60 degree bend 20 shown in Fig. 2 has a hub 21 at one end, and a spigot at the other end, and to which pipes 23 and 24 may be connected by commonly employed calking as shown, the latter pipe being indicated in broken lines. It will be noted that here again the cleanout 13' is located at the center of the heel 16' with its axis in alignment with the central radius 17' of the heel, and that pipes 23 and 24 may be reached through the opening 14 with equal facility, the angle of the radius 17' being simply closer to the horizontal than the radius 17, but nevertheless, as in fitting 10, equally dividing the angle of the fitting.

The invention may serve other useful purposes such as when applied to elbows in water lines for freeing pipes of rust or lime deposits.

While it is desirable to accurately position the cleanout as shown, it will be understood that an approximation thereto would answer the purpose of the invention.

I claim:

A waste pipe fitting having a uniform bore of the same diameter as the diameter of the connected pipes, and a cleanout opening in the heel thereof, the diameter of the said opening being substantially less than the diameter of said fitting, the said opening being screw-threaded, and a plug having mating threads, screwed into said opening, with the inner end thereof substantially flush with the inner wall of the fitting, whereby the inner wall is maintained free from objectionable projections or pockets the said fitting being for use solely as a pipe connection means.

FREDERICK J. VEITCH.